US012651688B2

(12) United States Patent
Hommedal et al.

(10) Patent No.: US 12,651,688 B2
(45) Date of Patent: Jun. 9, 2026

(54) SUBSEA CONTROL AND POWER ENCLOSURE

(71) Applicant: Siemens Energy AS, Oslo (NO)

(72) Inventors: Steinar Hommedal, Sandvika (NO); Swethnag Mahidhar Padakandla, Heimdal (NO); Helyson Parente, Trondheim (NO)

(73) Assignee: SIEMENS ENERGY AS, Oslo (NO)

( * ) Notice: Subject to any disclaimer, the term of this patent is extended or adjusted under 35 U.S.C. 154(b) by 393 days.

(21) Appl. No.: 18/044,382

(22) PCT Filed: Aug. 12, 2021

(86) PCT No.: PCT/EP2021/072489
§ 371 (c)(1),
(2) Date: Mar. 8, 2023

(87) PCT Pub. No.: WO2022/053253
PCT Pub. Date: Mar. 17, 2022

(65) Prior Publication Data

US 2023/0343503 A1 Oct. 26, 2023

(30) Foreign Application Priority Data

Sep. 10, 2020 (GB) ...................................... 2014236

(51) Int. Cl.
*H01F 27/00* (2006.01)
*H01F 27/14* (2006.01)

(52) U.S. Cl.
CPC .................................... *H01F 27/14* (2013.01)

(58) Field of Classification Search
CPC .... G03B 17/08; H01F 27/14; H01H 2231/044
See application file for complete search history.

(56) References Cited

U.S. PATENT DOCUMENTS 5,302,055 A * 4/1994 Johnston .................. G08B 3/06 441/89
5,797,430 A * 8/1998 Becke ................. F04B 11/0016 138/30

(Continued)

FOREIGN PATENT DOCUMENTS

EP 2570585 A1 3/2013
EP 3024308 A1 5/2016
EP 3404198 A1 11/2018

OTHER PUBLICATIONS

PCT International Search Report and Written Opinion of International Searching Authority mailed Nov. 19, 2021 corresponding to PCT International Application No. PCT/EP2021/072489 filed Aug. 12, 2021.

*Primary Examiner* — Rockshana D Chowdhury
*Assistant Examiner* — Douglas R Burtner

(57) ABSTRACT

An enclosure (10) for a subsea control and power arrangement (12), the enclosure (10) comprises: a cannister (14) and a lid (16), a connector assembly (20), a first volume compensator (22) and a second volume compensator (30). The cannister (14) and the lid (16) form an enclosure volume (18). The first volume compensator (22) having a first chamber (23), the first volume compensator (22) is mounted to the enclosure (10) outside the enclosure volume (18). The first chamber (23) has a variable volume. The second volume compensator (30) having a second chamber (31). The second chamber (31) has a variable volume. The connector assembly (20) extends through the lid (16) and into the enclosure volume (18) and comprises a housing (24) forming a third chamber (26) and a connector part (28). The connector part (28) is mounted at least partly within the housing (24) and the housing (24) is located at least partly within the enclosure volume (18), the connector part (28) extends through the housing (24) and into the enclosure (Continued)

volume (18). The first chamber (23), the second chamber (31) and the third chamber (26) are liquidly connected to one another to form a compensator volume (23, 31, 26). The compensator volume (23, 31, 26) is arranged, in liquid flow order, between the enclosure volume (18) and ambient (54) the enclosure (10) thereby forming at least two sealing barriers between ambient (54) and the enclosure volume (18).

16 Claims, 6 Drawing Sheets

(56) References Cited

U.S. PATENT DOCUMENTS

| | | | | |
|---|---|---|---|---|
| 6,405,760 | B1 * | 6/2002 | Tranter | B60T 7/042<br>138/30 |
| 9,038,433 | B2 * | 5/2015 | Skjetne | E21B 43/01<br>73/1.71 |
| 9,911,564 | B2 * | 3/2018 | Hadler-Jacobsen | H01H 85/0021 |
| 10,026,537 | B2 * | 7/2018 | Bjoerkhaug | H01F 27/343 |
| 10,109,445 | B2 * | 10/2018 | Hansen | H05K 5/0095 |
| 10,244,650 | B2 * | 3/2019 | Laneryd | H05K 7/209 |
| 10,259,598 | B2 * | 4/2019 | Rygaard | B64G 1/66 |
| 10,374,398 | B2 * | 8/2019 | Strømsvik | H02B 1/28 |
| 10,424,867 | B2 * | 9/2019 | Lewin | H02G 15/14 |
| 10,550,949 | B2 * | 2/2020 | Kanstad | F04D 29/108 |
| 10,677,273 | B2 * | 6/2020 | Trandal | F15B 21/006 |
| 10,914,497 | B2 * | 2/2021 | Bei | G06F 1/182 |
| 11,095,069 | B2 * | 8/2021 | Chaize | H01R 13/502 |
| 11,133,145 | B2 * | 9/2021 | Menon | H01H 85/48 |
| 11,325,685 | B2 * | 5/2022 | Kaeli | B63G 8/39 |
| 12,080,503 | B2 * | 9/2024 | Launonen | H01H 85/042 |
| 12,456,568 | B2 * | 10/2025 | Følkner | F15B 3/00 |
| 2003/0075225 | A1 * | 4/2003 | Dinkel | F15B 1/24<br>138/30 |
| 2008/0196925 | A1 * | 8/2008 | Findeisen | H01F 27/14<br>174/12 R |
| 2010/0139544 | A1 * | 6/2010 | Bo | H02P 27/06<br>318/400.27 |
| 2012/0291688 | A1 * | 11/2012 | Dawes | B63C 11/00<br>114/312 |
| 2013/0167962 | A1 * | 7/2013 | Skjetne | E21B 43/01<br>138/30 |
| 2015/0077205 | A1 * | 3/2015 | Boe | F16J 15/06<br>336/90 |
| 2015/0188297 | A1 * | 7/2015 | Boe | H05K 7/20263<br>174/564 |
| 2015/0188444 | A1 * | 7/2015 | Boe | B63G 8/08<br>363/37 |
| 2015/0260203 | A1 * | 9/2015 | Launonen | H01F 27/14<br>138/31 |
| 2016/0133422 | A1 * | 5/2016 | Breili | H01H 85/0021<br>337/204 |
| 2016/0215913 | A1 * | 7/2016 | Knoener | H01F 27/14 |
| 2016/0247622 | A1 * | 8/2016 | Bjoerkhaug | H01F 27/2823 |
| 2016/0281452 | A1 * | 9/2016 | Aarskog | E21B 41/0007 |
| 2017/0025213 | A1 * | 1/2017 | Reising | H05K 5/068 |
| 2017/0055356 | A1 * | 2/2017 | Kristensen | G01L 19/0672 |
| 2017/0164495 | A1 * | 6/2017 | Aarskog | H02M 7/00 |
| 2017/0280577 | A1 * | 9/2017 | Laneryd | H05K 7/20236 |
| 2018/0313372 | A1 * | 11/2018 | Trandal | H05K 7/20236 |
| 2019/0100292 | A1 * | 4/2019 | Austin | B63G 8/22 |
| 2019/0320545 | A1 * | 10/2019 | Launonen | H01F 38/00 |
| 2023/0343503 | A1 * | 10/2023 | Hommedal | H01F 27/14 |
| 2024/0047117 | A1 * | 2/2024 | Følkner | H05K 5/068 |

* cited by examiner

SUBSEA CONTROL AND POWER ENCLOSURE

FIELD OF INVENTION

The invention relates to a pressure compensator arrangement for compensating volume variations of a liquid in an enclosure of a subsea device.

BACKGROUND OF INVENTION

Traditionally, fixed or floating platforms, or floating production vessels, are used in the offshore oil and gas production. In the operation of offshore platforms, it can be necessary to install electrical equipment under water, e.g. for controlling functions of a subsea Christmas tree or a subsea blowout preventer. More recently, processing facilities are being relocated to the ocean floor. Installations on the ocean floor can comprise a range of components, including pumps, compressors and the like which require electric power for operation. Power supply can occur through a subsea power grid installed on the ocean floor, which may for example comprise a subsea transformer, a subsea switchgear and a subsea variable speed drive for powering the above mentioned subsea loads. It is essential that the installed equipment operates reliably even under the high pressure that prevails at the rated installation depth which can be 3,000 m or more.

To protect the equipment from the corrosive environment of the surrounding seawater and to deal with the high pressures, two different solutions were proposed. A pressure resistant enclosure can be provided, which has a close to atmospheric internal pressure, enabling the use of conventional electric and electronic components therein. Such enclosures need to have relatively thick walls and are thus bulky and heavy, since they have to withstand high differential pressures. Another solution is the use of pressurized (or pressure compensated) enclosures, which comprise a pressure compensator that balances the pressure in the enclosure to the pressure prevailing in the ambient seawater.

The pressurized enclosure is generally filled with a liquid, and components operated inside the pressurized enclosure are made to be operable under high pressures. The pressure compensator balances the pressure and compensates variations in the volume of the liquid filling the enclosure, which may for example occur due to variations in outside pressure and/or temperature. Temperature changes can also be caused by internal heating, e.g. by electric losses of components provided inside the enclosure of the subsea device. The corresponding volume increase of the liquid filling the enclosure may then be taken up by the pressure compensator, which is thus also termed volume compensator.

Pressure compensators may include bellows, bladders, pistons, membranes or the like. Bellows can have the disadvantage that they are either expensive to produce, or their configuration is such that the stroke length of the bellows is limited. In the latter case, a pressure compensator for a large volume of liquid (i.e. for an enclosure of a large subsea device) needs to have a significant size to provide the required compensation capacity. For some types of bellows, the bellows needs to have a size of more than three times of the size of the compensated volume. This results in a low utilization factor of the volume of the compensator system. Furthermore, the liquid filling such pressure compensator needs to be compensated itself (i.e. changes of its volume due to temperature/pressure changes need to be taken up by the compensator). Such compensator systems can thus be relatively large and heavy.

Furthermore, the bellows of such pressure compensator is often exposed to the subsea environment, in particular, to seawater. This may cause corrosion problems for the bellows and may lead to the ingress of seawater into the enclosure of the subsea device upon failure of the bellows.

WO2010/034880A1 describes a pressure compensator that has a first bellows chamber that is surrounded by a second bellows chamber, the second bellows chamber forming a closed intermediate space around the first bellows chamber. A double barrier against the ingress of sea water is thus provided. In the disclosed configuration, the compensation capacity is determined by the size of the first bellows. The whole volume inside the first bellows chamber and in addition the volume inside the second bellows chamber are dead volumes, the liquid filling these volumes additionally requiring pressure compensation. In such configuration, the pressure compensator needs to have a significant size and an increase in the compensation capacity results in a significant increase in the dead volume.

US 2013/0167962 A1 relates to a pressure compensator for a subsea device with at least one outer bellows and a first chamber enclosed by the outer bellows.

EP 2 570 585 A1 relates to a subsea transformer including a pressure compensation device with first and second bellows.

EP 3 048 619 B1 discloses a pressure compensator for providing pressure compensation for a chamber of a subsea device is provided. The pressure compensator has an enclosure with at least an outer wall. A first compensation chamber is provided inside the enclosure. A flow connection from the first compensation chamber towards the chamber of the subsea device is further provided. As second compensation chamber is provided inside the enclosure. First and second separating walls are arranged inside the enclosure. A first bellows portion of the first separating wall and a second bellows portion of the second separating wall are deformable to provide pressure compensation between the chamber of the subsea device and a second inner volume around which the second separating wall extends.

It is desirable to provide a pressure compensator for use with a subsea device that can be manufactured easily and cost efficiently. It is further desirable that the pressure compensator is reliable during operation and has a long lifetime. It is desirable to reduce the size and weight of pressure compensators, and to increase the utilization factor and compensation capacity. Also, it is desirable that the pressure compensator is protected from corrosion and provides protection against seawater ingress. It is desirable to improve maintenance and handling of enclosures and connections to facilitate installation and retrieval from deep subsea locations which would otherwise be very high cost operations.

Importantly, it is an object of the present invention to provide an enclosure which is capable of utilising electrical connectors that are not suitable for high-pressure differentials such as very deep sea applications, for example at depths of 3000 m or more.

STATEMENT OF INVENTION

It is an object of the present invention to provide a pressure or volume compensated enclosure that addresses the above desires.

In accordance with a first aspect an enclosure for a subsea control and power arrangement. The enclosure comprises: a cannister and a lid, the cannister and the lid form an enclosure volume, a connector assembly, a first volume compensator having a first chamber, the first volume compensator is mounted to the enclosure outside the enclosure volume, the first chamber has a variable volume and a second volume compensator having a second chamber, the second chamber has a variable volume. The connector assembly extends through the lid and into the enclosure volume and comprises a housing forming a third chamber and a connector part. The connector part is mounted at least partly within the housing and the housing is located at least partly within the enclosure volume. The connector part extends through the housing and into the enclosure volume. The first chamber, the second chamber and the third chamber are liquidly connected to one another to form a compensator volume. The compensator volume is arranged, in liquid flow order, between the enclosure volume and ambient the enclosure thereby forming at least two sealing barriers between ambient and the enclosure volume.

In this arrangement, the enclosure is pressure compensated, in other words, the ambient pressure, e.g. 300 atmospheres, is present within the enclosure volume and the compensator volume. Thus, pressure differentials across the sealing barriers (and other seals) is greatly minimised. This minimised pressure differential means that the enclosure can be relatively lightweight and easy to install and retrieve, inexpensive and be highly durable. Further, the pressure differential is minimal so that a wide range of connectors, unsuitable for high pressure differentials, can be used.

The compensator volume and/or the enclosure volume may be completely filled with liquid. Preferably the liquid is a dielectric liquid and preferably a dielectric oil.

Any one or both the first volume compensator and the second volume compensator may comprise any one of the group a bellows arrangement, a balloon arrangement and a membrane. Preferably the membrane is deformable or stretchable.

The first volume compensator may comprise a housing and a membrane, the membrane is arranged within the housing and forms therein a first chamber. The first chamber is part of the compensator volume. The housing comprises an aperture to liquidly connect ambient with the opposite side of the membrane to the first chamber.

The first volume compensator may comprise a housing and a bellows. The bellows may be arranged within the housing and forms therein a first chamber. The first chamber may be part of the compensator volume. The housing may comprise an aperture to liquidly connect ambient with the opposite side of the bellows to the first chamber.

The first volume compensator may comprise a housing and a membrane. The membrane may be arranged within the housing and form therein a first chamber. The first chamber may be part of the compensator volume. The housing may comprise an aperture to liquidly connect ambient with the opposite side of the bellows to the first chamber.

The membrane may be deformable and/or stretchable.

The second volume compensator may comprise a bellows arrangement. The bellows arrangement may surround the housing of the connector assembly and may form therewith the second chamber. The housing of the connector assembly may comprise at least one aperture which liquidly connects the second chamber and the third chamber.

The second volume compensator may comprise a bellows arrangement. The bellows arrangement may form the second chamber. The bellows arrangement may be secured to an internal surface of the lid. A passage may extend through the lid and liquidly connects between the second chamber and the first chamber.

The second volume compensator may comprise a balloon arrangement. The balloon arrangement forms the second chamber. The balloon arrangement may be secured to an internal surface of the lid. A passage may extend through the lid and liquidly connects between the second chamber and the first chamber.

The lid may comprise a first sealing surface and a second sealing surface. The cannister may comprise a first sealing surface and a second sealing surface. A first seal may be located between the first sealing surfaces. A second seal may be located between the second sealing surfaces. Any one or more of the first and second seals may be a double seal i.e. there are two or more seals forming the first seal and there are two or more seals forming the second seal.

Any one or more the first and second seals may be any one of a metallic seal or an elastomeric seal, such as a rubber or silicone based material.

The first pressure compensator may be mounted to an external surface of the lid or an external surface cannister.

One or more input and/or output connectors may be connected to the enclosure.

Electronic and/or electrical equipment may be located within the enclosure volume.

BRIEF DESCRIPTION OF THE DRAWINGS

An example of an enclosure for electronic and electrical components or equipment and associated method of operation in accordance with the present invention will now be described with reference to the accompanying drawings in which.

DETAILED DESCRIPTION OF INVENTION

Figure 1:
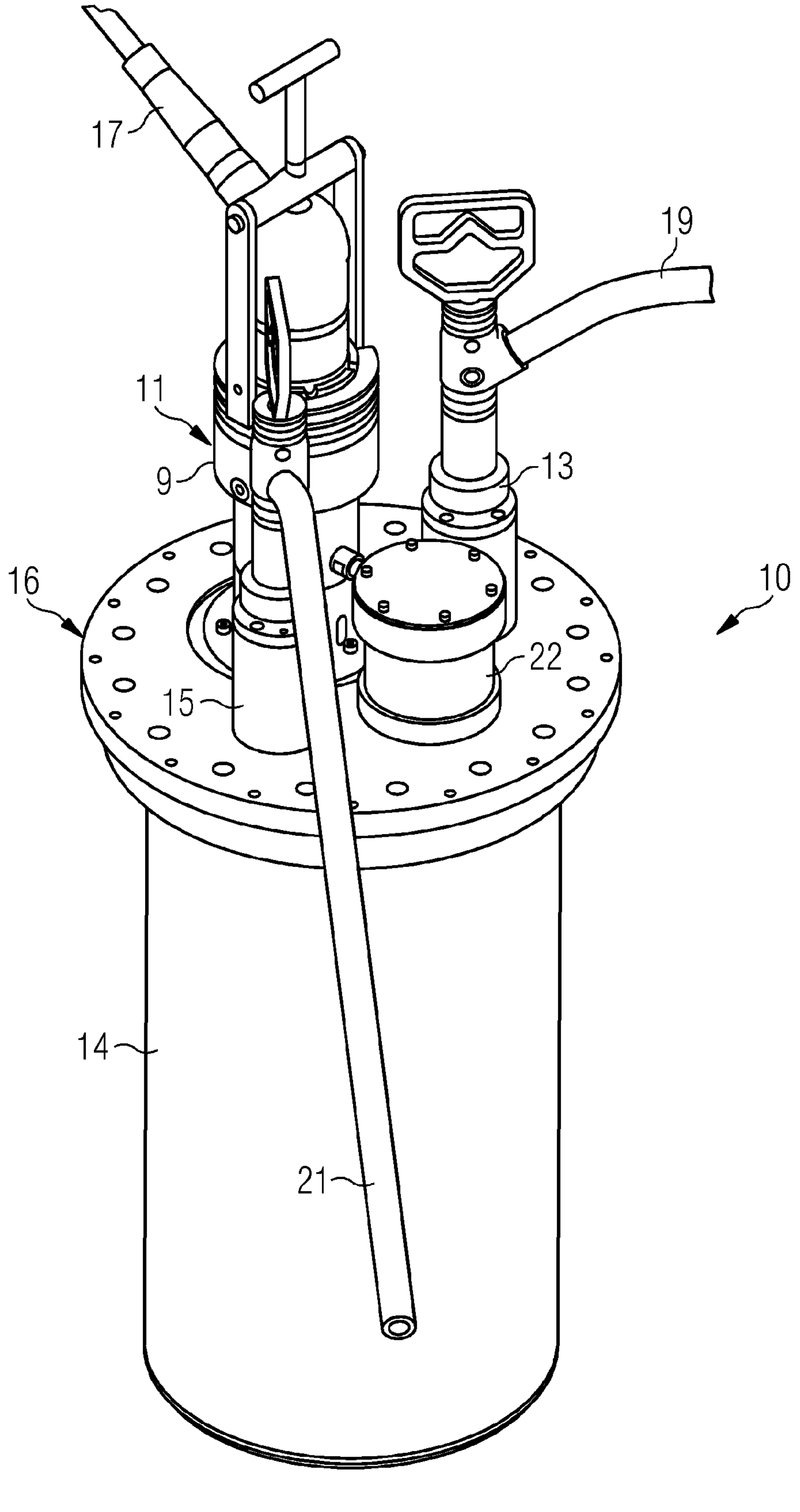
FIG. 1 is a view on an enclosure in accordance with the present invention.

FIG. 1 is a view on an enclosure 10 in accordance with the present invention. The enclosure 10 may be used for housing a subsea control and/or power arrangement. The enclosure 10 comprises a cannister 14 and a lid 16. In this example, a power-in connector 11, two power-out connector 13, 15 and a first volume compensator 22 are mounted to the enclosure 10 and as shown mounted to and through the lid 16. Power cables 17, 19 and 21 extend from the power-in connector 11 and the two power-out connectors 13, 15 respectively. Further connectors may be present in other examples.

The power-in connector 11 is a SpecTron® connector, but other connectors may be used. The two power-out connectors 13 are DigiTron® connectors, but other connectors may be used. Other connectors made by other manufactures may also be used.

Figure 2:
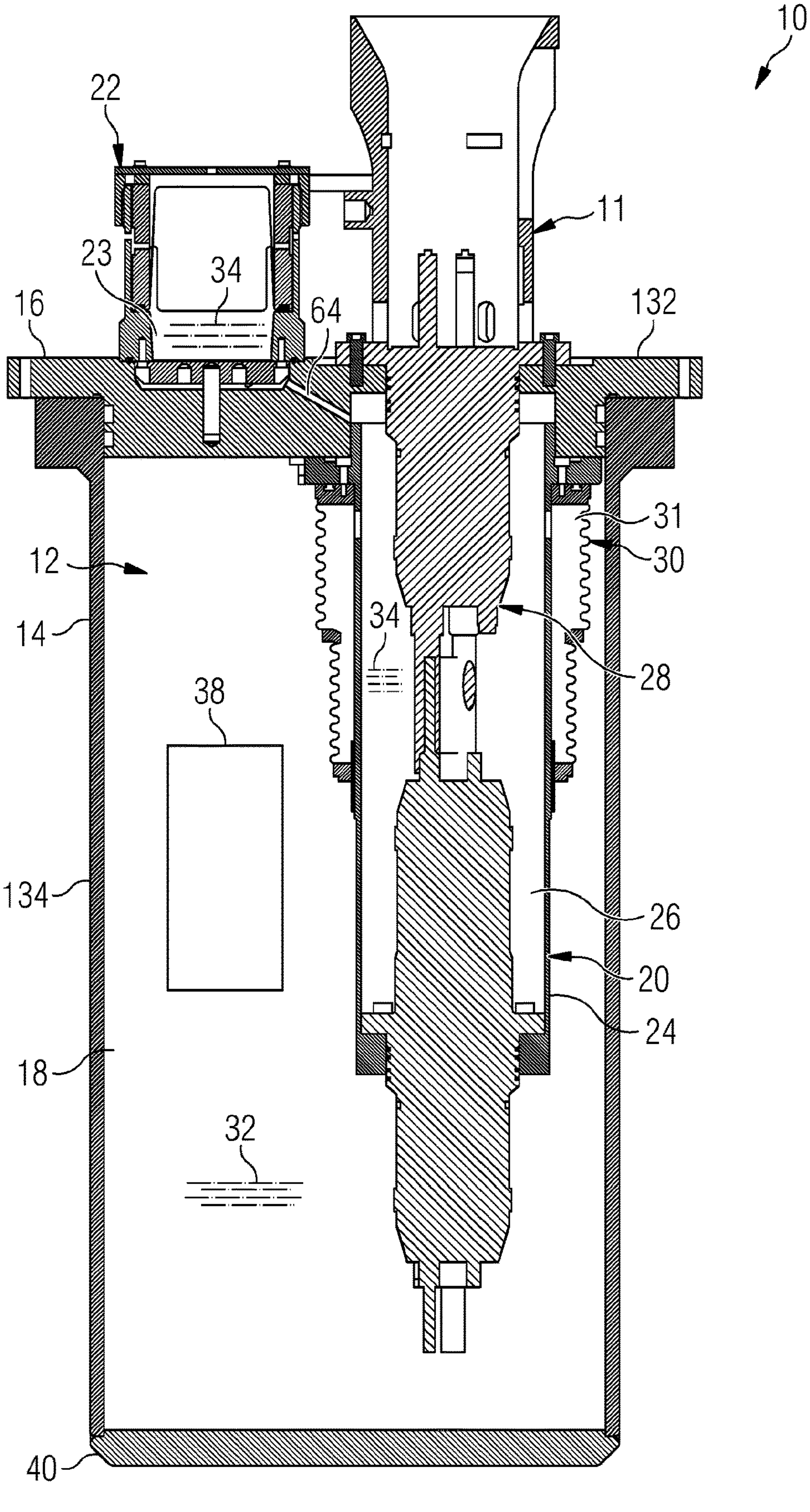
FIG. 2 is a schematic section through the enclosure and showing a first embodiment of a first volume compensator and a first embodiment of a second volume compensator in accordance with the present invention.

FIG. 2 is a schematic section through the enclosure 10 shown in FIG. 1 and in accordance with the present invention. The enclosure 10 is for housing a subsea control and power arrangement 12. The subsea control and power arrangement 12 comprises known electronic and electrical components such as a transformer 38 and at least one connector assembly 20. The connector assembly 20 is known and may be an input power connector as indicated as 11 in FIG. 1. Other connectors are attached as shown in FIG. 1 and may be input and/or output connectors. The connectors are capable of being mated and de-mated by a remotely operated vehicle (ROV) as is known in the art. The input connector(s) may be connected to the output connector(s) via electrical components such as the transformer 38.

The cannister 14 is generally tubular and is sealed with a cap 40 at one end and with the lid 16 at its other end. The cap 40 is generally disc shaped and is welded to the cannister 14. Alternatively, the cannister 14 and the cap 40 may be monolithically formed. The cannister 14 and the lid 16 form an enclosure volume 18. The electronic and electrical components 38 and connector assembly 20 are housed within the enclosure volume 18. The connector assembly 20 is mounted to the lid 16 and extends through the lid 16 and into the enclosure volume 18.

The connector assembly 20 comprises a connector part 28 for the electrical connection. The connector part 28 is a receptacle 28 in this example, but it may be a plug in other examples. In this example, the input power connector 11 comprises the receptacle 28 and a plug 9 as shown in FIG. 1 and as known in the art. The connector part 28 extends through the housing 24 and into the enclosure volume 18 so that connections can be made (not shown) to the electrical or electronic equipment, such as the transformer 38, within the enclosure volume 18.

The enclosure 10 comprises a first volume compensator 22 having a first chamber 23 and a second volume compensator 30 having a second chamber 31. The connector assembly 20 comprises a housing 24 that forms a third chamber 26. The first chamber 23, the second chamber 31 and the third chamber 26 are liquidly connected to, i.e. liquid can flow between, one another to form a compensator volume 23, 31, 26. The first volume compensator 22 and the second volume compensator 30 are capable of accommodating volume changes and will be described in more detail later. In all the embodiments described herein it should be noted that the first volume compensator 22 and the second volume compensator 30 have mechanisms that have variable volumes, i.e. variable compensator volumes 23, 31, that are capable of accommodating volume changes of liquids such as in this example a dielectric oil. The first volume compensator 22 is mounted to the enclosure 10 outside the enclosure volume 18 and as shown on an external surface 132 of the lid 16, but it could be mounted to an external surface 134 of the cannister 14. The first chamber 23 has a variable volume and the second chamber 31 has a variable volume.

The enclosure volume 18 is completely filled with preferably a dielectric liquid 32 and the compensator volume 23, 31, 26 is completely filled with dielectric liquid 34. Non-dielectric liquids could be used where the electrical or electronic equipment in the enclosure volume are otherwise electrically insulated. The term 'liquid' covers both dielectric and non-dielectric liquids and are both referred to as 'liquid' herein. Dielectric liquid 32 and dielectric liquid 34 have the same composition, but it is possible for the dielectric liquids 32, 24 to have different compositions. The dielectric liquids 32, 34 electrically insulate the electronic and electrical components 38. The dielectric liquids 32, 34 have a relatively low coefficient of thermal expansion, however, changes in temperature of the dielectric liquids 32, 34 cause their volume to change. In use, the electronic and electrical components heat up and increase the temperature of the dielectric liquids 32, 34 and in particular increase the temperature of the dielectric liquid 32 within the enclosure volume. The dielectric liquid 32 surrounds and is in direct contact with the transformer 38 (and/or other electronic or electrical components) and therefore can receive a significant heat input. The dielectric liquids 32, 34 increase in volume as they heat up and the first chamber 23 expands or increases in volume to accommodate the volume increase of the liquids 32, 34. Similarly, when the transformer 38 is less utilised or non-operational and cooler, the dielectric liquid 32, 34 cools and reduces in volume and the first chamber 23 contracts or decreases in volume to accommodate the dielectric liquid's volume decrease.

It is very important that seawater does not contaminate the enclosure volume 18 and contact the electronic and electrical components. Seawater is corrosive and may cause premature failure of the electronic and electrical components 38. It is very costly to mount a maintenance operation and replace the electronic and electrical components 38. It is highly undesirable to allow failure of the electronic and electrical components 38 because this would result in a power failure to important loads that demand electrical power and/or control signals passing through the enclosure 10. The present enclosure 10 described herein combats these problems in two ways.

Firstly, to provide two sealing barriers between ambient, e.g. seawater, and the enclosure volume 18. As will become apparent, the compensator volume 23, 31, 26 is arranged, in liquid flow order, between the enclosure volume 18 and ambient seawater. In the very unlikely situation of seawater ingress to the enclosure volume 18, the seawater (in liquid flow order) would have to leak through the first volume compensator 22 and into the compensator volume 23, 31, 26 and then through the second volume compensator 30 and into the enclosure volume 18. Thus, the present enclosure 10 forms (at least) two sealing barriers between ambient and the enclosure volume 18 via the pressure compensating arrangement of the first volume compensator 22 and the second volume compensator 30. Leakage of seawater through first barrier and into the compensator volume 23, 31, 26 will have no consequence for operation because components within the compensator volume 23, 31, 26 are resistant to damage from seawater.

Secondly, the enclosure is arranged to be pressure compensated, that is the internal pressure within the enclosure volume 18 is the same or approximately that of ambient seawater pressure. Note that the present enclosure is intended to be capable of operating at subsea depths of at least 3000 m. Pressure equalization is via seawater ports in the housing of the first volume compensator 22. This aspect will be described in more detail later.

Figure 3:
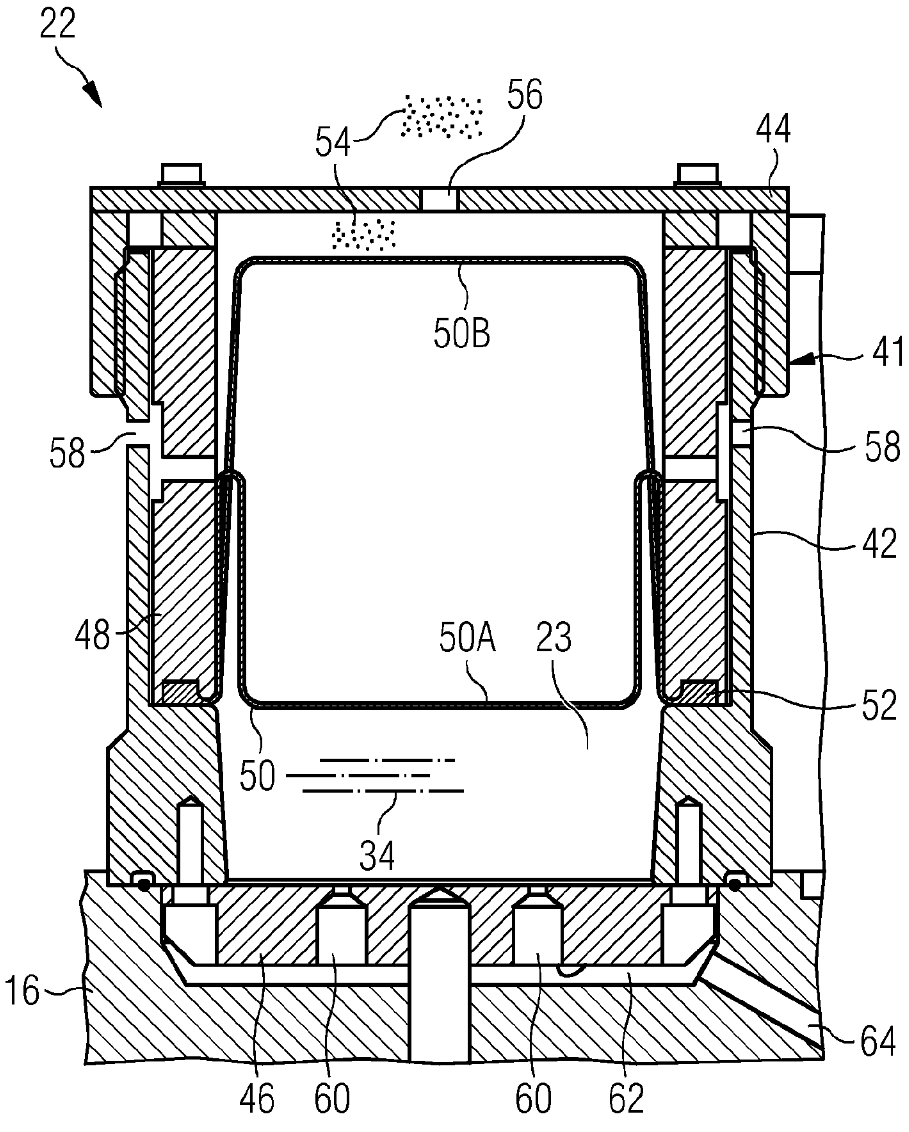
FIG. 3 is an enlarged view of the first embodiment of the first volume compensator shown in FIG. 1.

FIG. 3 shows the first volume compensator 22 in greater detail. The first volume compensator 22 comprises a housing 41, the housing is formed by a wall 42, a closing plate 44 and a base 46. The base 46 and the closing plate 44 are bolted to the wall 42. An internal sleeve 48 fits tightly inside the wall 42. A membrane 50 is circumscribed by a bead 52 which runs around its periphery. The bead 52 is trapped between the wall 42 and the sleeve 48. The first chamber 23 is defined one side, the inside, of the membrane 50 and is filled with the dielectric liquid 34. On the other side, the outside, of the membrane 50 is seawater 54 which can ingress the first volume compensator 22 via a hole 56 in the closing plate 44; additionally, holes 58 may be provided through the wall 42 and sleeve 48. The base 46 comprises a series of apertures 60 that lead to a gallery 62. The gallery 62 is formed between the base 46 and the lid 16. A passage 64 is defined through the lid 16, also see in FIG. 2, and liquidly connects the gallery 62 and the third chamber 26 such that dielectric liquid 34 can flow between the first chamber 23 and the third chamber 26.

The membrane 50 is an elastomeric material such as a silicone rubber, but other resilient materials are equally usable such as acrylonitrile butadiene rubber (NBR) or other rubber based materials. The membrane 50 may be reinforced to provide high durability.

FIG. 3 shows two positions of the membrane 50. A first position of the membrane 50 is referred to as 50A and a second position of the membrane 50 is referred to as 50B. There is an increase in the volume of the first chamber 23 as the membrane 50 moves between position 50A and position 50B and in the direction from position 50A to position 50B. There is a decrease in the volume of the first chamber 23 as the membrane 50 moves between position 50A and position 50B and in the direction from position 50B to position 50A. The membrane 50 will tend towards position 50B when the dielectric liquids 34, 32 increase in temperature or are 'hot' and will tend towards position 50A when the dielectric liquid 34, 32 decrease in temperature or are 'cold'. Seawater 54 is forced out of and into the first volume compensator 22 on the outside of the membrane 50 according to increased or decreased volumetric changes respectively in the first chamber 23. The membrane 50 is deformable between the first position 50A and the second position 50B and in this example the membrane 50 does not appreciably stretch or expand, although it may also do so. As can be seen most clearly in FIG. 3, in position 50A the membrane 50 has a folded portion to accommodate the smaller volume of 'cold' dielectric liquid. In position 50B, the membrane has unfolded to accommodate a larger volume of 'hot' dielectric liquid. In other embodiments, the membrane 50 may be flexible and/or stretchable, in addition to being deformable, to accommodate the necessary volume changes of the dielectric oil.

Figure 4:
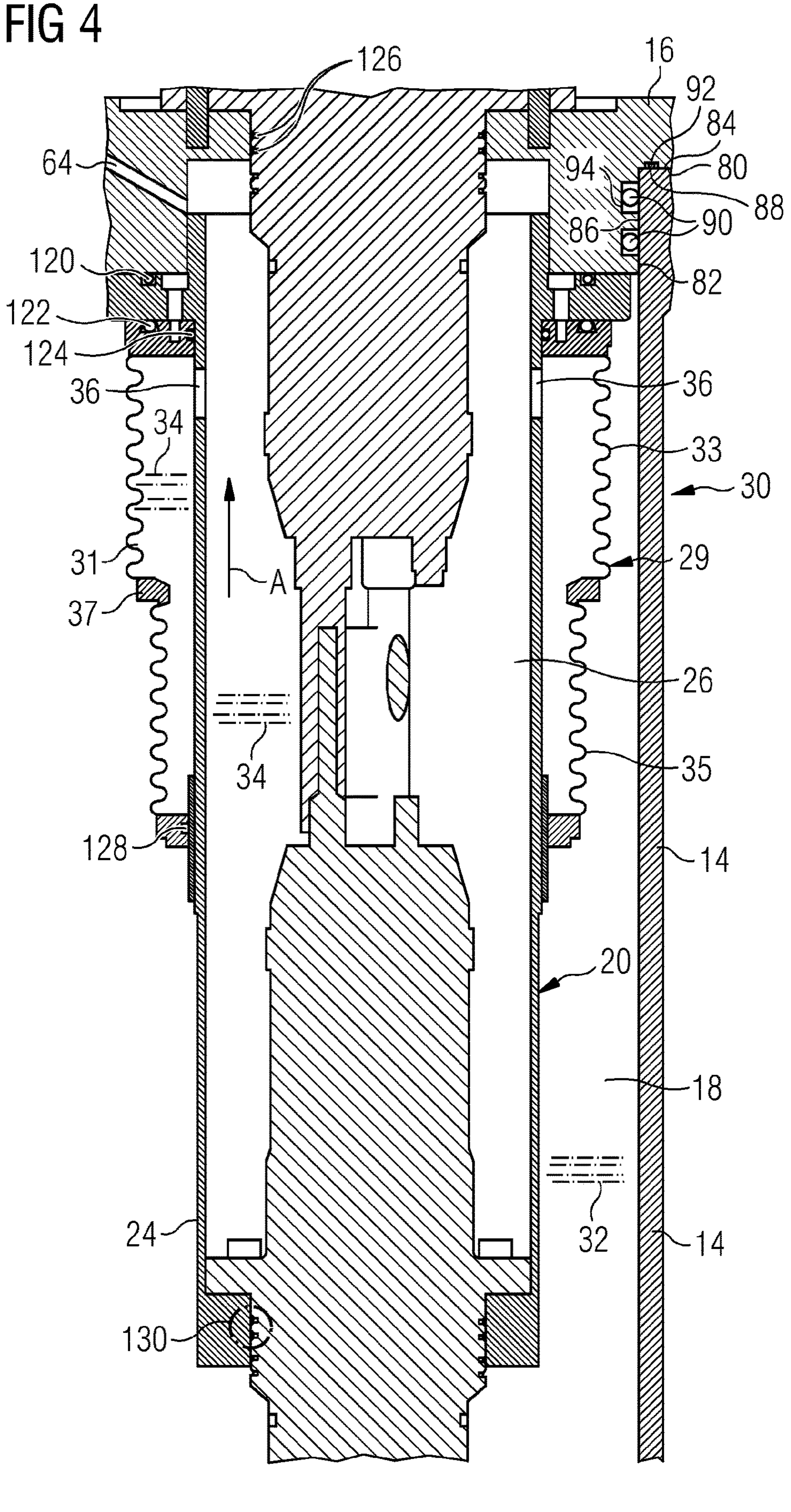
FIG. 4 is an enlarged view of the first embodiment of the second volume compensator shown in FIG. 1.

FIG. 4 shows a schematic section through the second volume compensator 30 in greater detail than FIG. 2 and in accordance with the present invention. The second volume compensator 30 comprises a bellows arrangement 29. The bellows arrangement 29 surrounds the housing 24 of the connector assembly 20 and forms the second chamber 31. The bellows arrangement 29 comprises a first bellows 33 and a second bellows 35. The first bellows 33 has a greater diameter (or cross-sectional area) than the second bellows 35. The first bellows 33 and the second bellows 35 are attached to one another via a ring 37. The first and second bellows 33, 35 are formed from a metallic composition, but other materials may be used. The first and second bellows 33, 35 are formed with corrugations or other known configuration and which is relatively flexible in compression or extension. The first bellows 33 is rigidly fixed relative to the housing 24 at its opposite end to the ring 37. The second bellows 35 is rigidly fixed to the housing 24 at its opposite end to the ring 37.

The housing 24 comprises at least one aperture 36 and preferably an array of apertures 36. The apertures 36 liquidly connect the second chamber 31 and the third chamber 26 such that dielectric liquid 34 may flow from one chamber to the other chamber.

An increase in temperature and corresponding increase in volume of the dielectric liquid 32, 34 increases pressure in the enclosure volume 18. The increase in pressure forces the ring 37 to move in the direction of arrow A. As the ring 37 moves in the direction of arrow A, the first bellows 33 compresses and the second bellows 35 extends. The compression of the first bellows 33 causes a greater reduction in its volume than the increase in volume of the second bellows 35. The nett reduction in volume of the second chamber 31 is approximately equivalent to the change in volume of the dielectric liquid 32 and 34 caused by its increasing temperature. In turn, dielectric liquid 34 in the third chamber 26 is forced through the passage 64 and into the first chamber 23.

Figure 5:
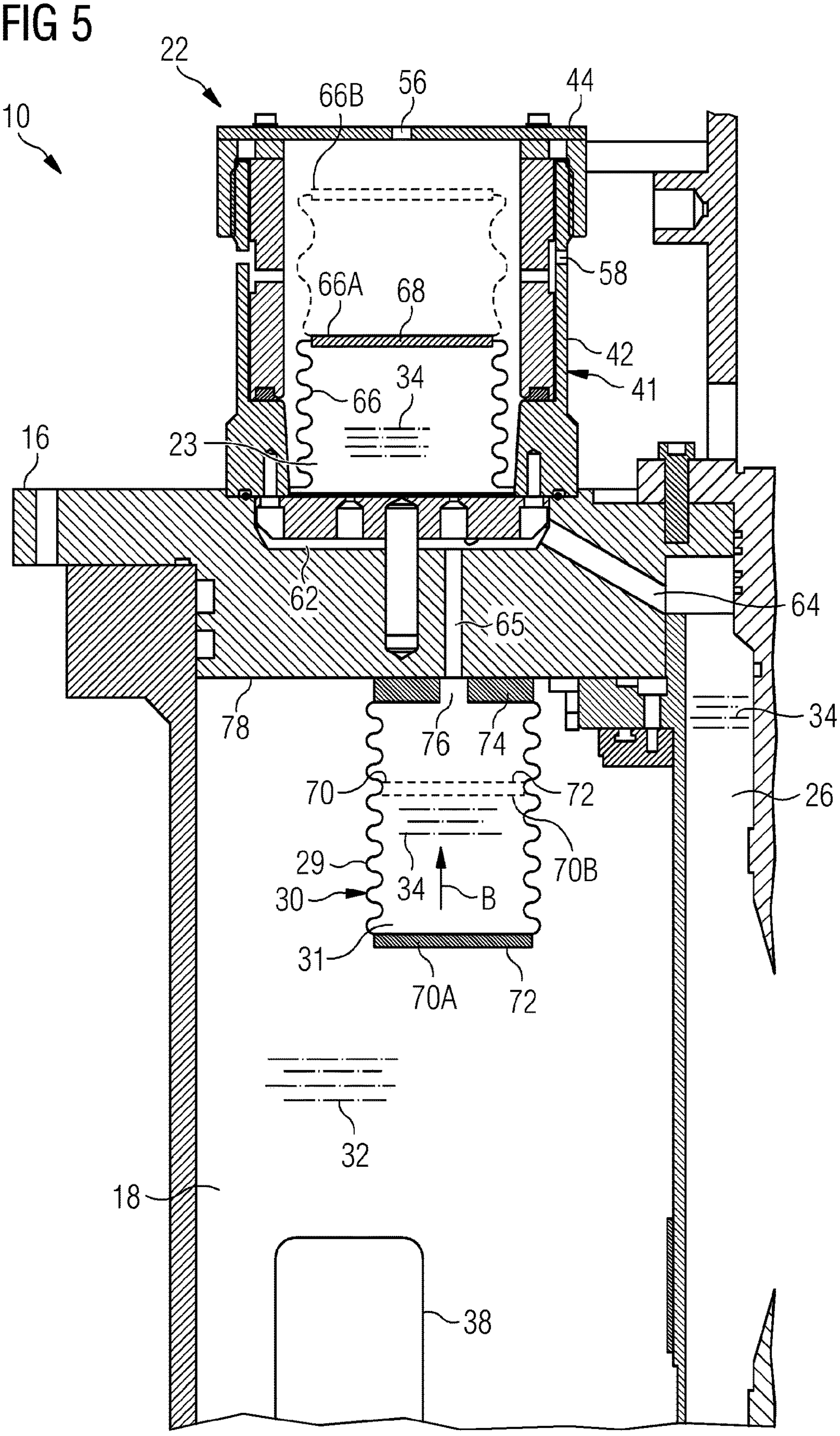
FIG. 5 is an enlarged schematic section of a second embodiment of the first volume compensator and a second embodiment of the second volume compensator and in accordance with the present invention.

FIG. 5 is an enlarged view of the section through a second embodiment of the first volume compensator 22 and a second embodiment of the second volume compensator 30. Like components are given the same reference numerals as before and otherwise operate in like manner as described herein. It should be noted that the present invention may be realised by using the first embodiment of the first volume compensator 22 with the first and/or second embodiments of the second volume compensator 30 and may be realised by using the second embodiment of the first volume compensator 22 with the first and/or second embodiments of the second volume compensator 30.

For the second embodiment of the first volume compensator 22, the membrane 50 is replaced by a bellows 66 which is located inside the housing 41. The sleeve 48 is largely obsolete and could be omitted and optionally with the wall 42 being thickened to occupy the space left by omitting the sleeve 48. The bellows 66 has an end plate 68 that closes one of its ends and at its other end the bellows 66 is open to the gallery 62. The bellows 66 defines the first chamber 23. The bellows 66 is affixed, for example by welding, at its open end to the wall 42 and towards or close to the gallery 62. The gallery 62 is liquidly connected to the third chamber 26 via the passage 64 as described before. In use, the electronics and electrical components heat up and heat the dielectric liquids 32, 34, which in turn increase in volume. Dielectric liquid 34 in the third chamber 26 is forced through the passage 64 by virtue of the volume of the third chamber 26 not changing and dielectric liquid 34 in the second chamber 31 is forced through the passage 64 by virtue of the increase in volume of the dielectric liquid 32 in the enclosure volume 18 forcing the bellows arrangement 29 to compress as described with reference to FIG. 4.

For the second embodiment of the second volume compensator 30, the bellows arrangement 29 comprises a bellows 70 having an end plate 72 that closes one end of the bellows 70 and another end plate 74 at the other end of the bellows 70. The end plate 74 is affixed directly, by welding for example or possibly by bolts in a conventional manner, to the inside surface 78 of the lid 16. The bellows 70 defines the second chamber 31. The end plate 76 defines an aperture 76 which is part of a passage 65 defined through the lid 16. The passage 65 is arranged to allow liquid communication, i.e. the flow of dielectric liquid 34, between the gallery 62 and the second chamber 31. In use, the electronics and electrical components heat up and heat the dielectric liquids 32, 34, which in turn increase in volume. Dielectric liquid 34 in the third chamber 26 is forced through the passage 64 by virtue of the volume of the third chamber 26 not changing and dielectric liquid 34 in the second chamber 31 is forced through the passage 65 by virtue of the increase in volume of the dielectric liquid 32 in the enclosure volume 18 forcing the bellows 70 to compress from a first position 70A to a second position 70B and in the direction of arrow B.

Implementation of the second embodiment of the second volume compensator 30 may allow the absence of the first embodiment of the bellows arrangement 29, i.e. removal of the first bellows 33 and the second bellows 35, as shown and described with reference to FIGS. 2 and 4 from one or all the connectors 11, 13 and 15.

With reference to FIG. 1, there is shown one power-in connector 11 and two power-out connectors 13, 15. The enclosure 10 may have more or less connectors. The above embodiments have been described with reference to the power-in connector 11 having a connector assembly 20 which defines the third chamber 26. It should be appreciated that the other connectors 13, 15 also comprise similar connector assemblies 20 and which define similar third chambers 26. All these third chambers 26 are liquidly connected to the gallery 62 of the first volume compensator 22 via similar passages 64. The passages 64 extend through the lid 16 to the other connectors 13, 15. Alternatively, two or more first volume compensators 22 may be present and the other connectors 13, 15 may be liquidly connected to any one of the first volume compensators 22.

In addition to the dielectric liquid 34 in the third chamber(s) 26 increasing and decreasing in volume because of temperature changes, when mating and de-mating the plug and receptacle of the connectors 11, 13, 15 the dielectric liquid will be displaced to accommodate the volume of the electrical connector pins of the connectors 11, 13, 15. Thus, when mating the plug and receptacle dielectric liquid is forced through the passage 64 and into the first volume compensator 22 and when de-mating the plug and receptacle dielectric liquid is forced through the passage 64 from the first volume compensator 22 to the third chamber 26. This is independent to any temperature changes of the dielectric liquids 32, 34.

Good sealing is a vital aspect of the present invention and in addition to the two sealing barriers arrangement provided by the first and second volume compensators, the cannister 14, lid 16 and other components also have two independent seals where the components are releasably attached to one another.

Figure 6:
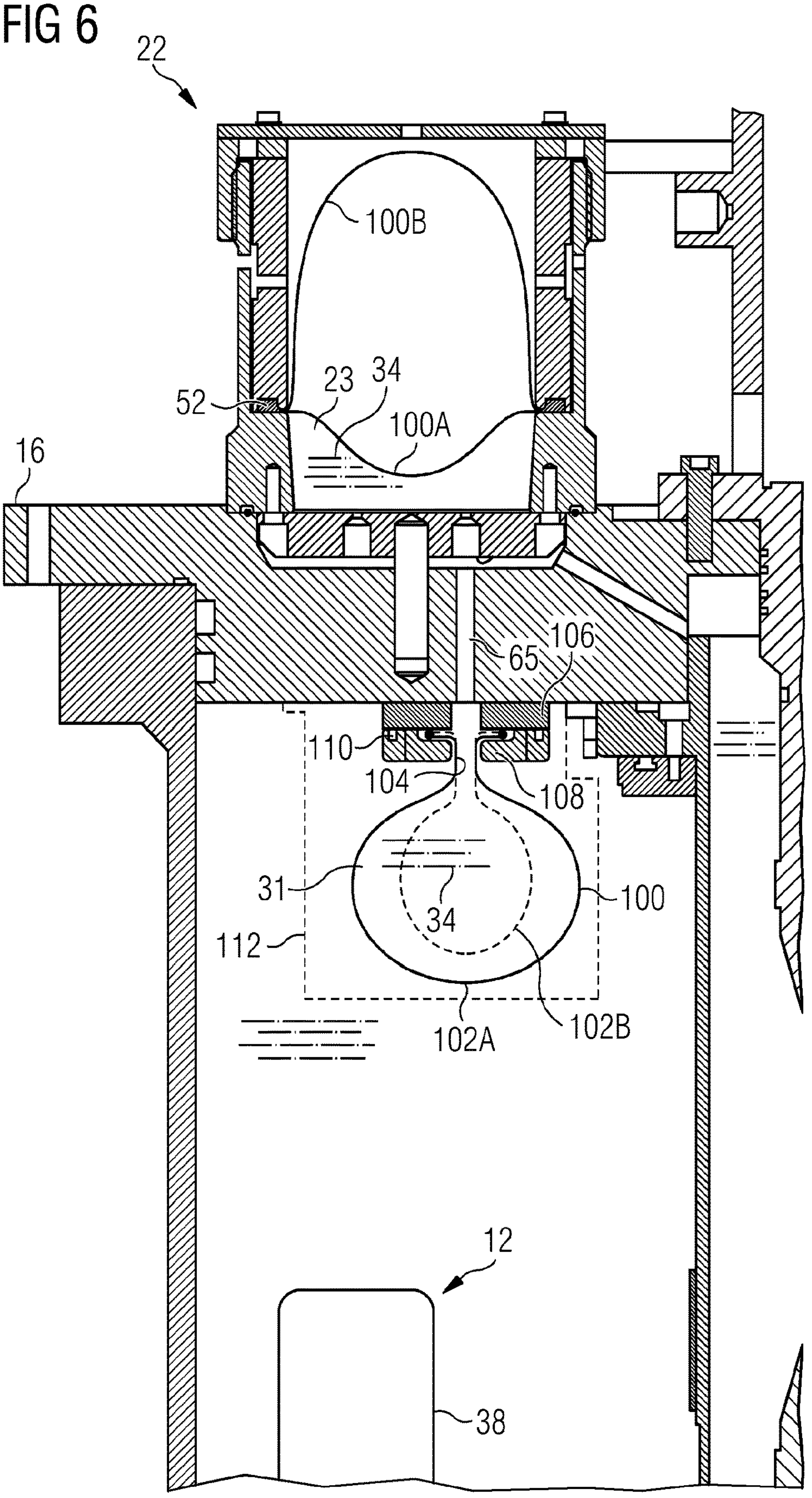
FIG. 6 is an enlarged schematic section of a third embodiment of the first volume compensator and a third embodiment of the second volume compensator and in accordance with the present invention.

FIG. 6 is an enlarged view of a section through a third embodiment of the first volume compensator 22 and a third embodiment of the second volume compensator 30. FIG. 6 is similar FIG. 5 and has similar components which operate in a similar way unless stated otherwise.

The third embodiment of the first volume compensator 22 comprises an elastic membrane 100 which is stretchable between a first shape 100A and a second shape 100B. The elastic membrane 100 is stretchable to define the first chamber 23. The second shape 100B defines a greater volume of the first chamber 23 than the first shape 100A. Similar to the membrane 50 of the first embodiment of the first volume compensator 22, the membrane 100 is circumscribed by a bead 52 which runs around its periphery. The bead 52 is trapped between the wall 42 and the sleeve 48 to secure the membrane 100 to the housing 41 and to seal around it.

The third embodiment of the second volume compensator 30 comprises a balloon arrangement comprising a balloon 102 that is formed from an elastic material and is capable of expanding and contracting between a first shape 102A and a second shape 102B. The balloon 102 has a stem 104 or neck. The stem 104 has a bead 106 that is trapped by plates 106, 108 which are bolted together and define seals 110 therebetween.

The balloon 102 may be protected by a shield 112 shown in dashed lines. The shield 112 has apertures or may be perforated to allow easy flow of dielectric liquid. The shield 112 is intended to only protect the balloon 102 from damage during use, installation and disassembly.

The membrane 100 (and 50) and the balloon 102 are formed from an elastomeric material such as a silicone rubber, but other resilient materials are equally usable such as acrylonitrile butadiene rubber (NBR) or other rubber based materials.

As described above, there it is essential for the enclosure to have a very high level of sealing. As described herein the two volume compensators 22, 30 each provide one seal barrier thereby in concert they provide two seal barriers and a compensator volume therebetween to ensure seawater cannot ingress to the enclosure volume 18. The enclosure 10 further comprises conventional sealing arrangements that provide two seals between the enclosure volume 18 and seawater 54. Referring to FIG. 4 again, the lid 16 comprises at least a first sealing surface 80 and a second sealing surface 82 and the cannister 14 comprises at least a first sealing surface 84 and a second sealing surface 86. A first seal 88 is located between the first sealing surfaces 80, 84 and a second seal 90 is located between the second sealing surfaces 82, 86. The first and second seals 88, 90 are conventional O-ring seals and either seal may be either metallic or non-metallic. As shown the seals 88, 90 are located within a respective groove 92, 94 within the sealing surfaces 80, 82 respectively; however, the grooves 92, 94 may be formed in the sealing surfaces 84, 86 respectively of the cannister 14. There are two grooves 90 and seals 88 between the second sealing surfaces 82, 86. There may be more than one groove 92 and first seal 88 between the first sealing surfaces 80, 84.

Other seals are provided which are effectively 'internal' or within the two-barrier system described herein. Still referring to FIG. 4, conventional O-ring seals 120, 122, 124, 126, 128, 130 are fitted into grooves defined in and between abutting components.

This enclosure 10 allows relatively easy assembly, achieving two-barrier sealing, without any need for seal-welding to take place, which would be more complicated and costly. The lid 14 may be made solely by machining with no welding operations. This enclosure 10 allows the use of electrical connectors having penetrators which, significantly, do not have sufficiently high sealing capability for high differential pressures (possibly approximately 300 atmospheres) that can be encountered subsea at for example depths of approximately 3000 m. This enclosure 10 therefore allows the use existing electrical connectors without any special adaptation of the electrical connectors. Furthermore, this enclosure 10 provides a lighter and smaller solution than previously known and hence reduces manufacturing costs and installation complexity and therefore further cost savings.

Any one or more of the embodiments of the first volume compensator 22 may be used with any one or more of the embodiments of the second volume compensator 30. In any combination, there is always at least two leakage barriers between ambient seawater 54 and the enclosure volume 18, hence the electronics and electrical components 38 in the enclosure volume 18. As mentioned, the compensator volume 23, 31, 26 comprises the first, second and third chambers and is arranged between, in leakage flow sequence, ambient seawater 54 and the enclosure volume 18.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

It should be noted that the term "comprising" does not exclude other elements or steps and "a" or "an" does not exclude a plurality. Elements described in association with different embodiments may be combined. It should also be noted that reference signs in the claims should not be construed as limiting the scope of the claims. Although the invention is illustrated and described in detail by the preferred embodiments, the invention is not limited by the examples disclosed, and other variations can be derived therefrom by a person skilled in the art without departing from the scope of the invention.

The invention claimed is:

1. An enclosure for a subsea control and power arrangement, the enclosure comprising:

a cannister and a lid connected to the cannister to form an enclosure volume, the enclosure volume containing a first fluid and one of a control device and a power device;

a first volume compensator having a first chamber and a second chamber each having a variable volume separated by a membrane, the first chamber filled with an ambient fluid and the second chamber filled with a second fluid different from the ambient fluid;

a second volume compensator having a third chamber forming a variable volume and partially defined by a bellows; and a connector assembly extending through the lid and into the enclosure volume, the connector assembly including a housing that defines a fourth chamber and a connector part, the connector part mounted at least partly within the housing, the housing cooperating with the bellows to define the third chamber; and the second chamber, the third chamber and the fourth chamber are liquidly connected to one another to form a compensator volume, wherein the first fluid, the second fluid, and the ambient fluid are fully separated from one another.

2. The enclosure of claim 1, wherein the compensator volume and/or the enclosure volume is completely filled, and wherein the first fluid and the second fluid are one of a dielectric liquid and a dielectric oil.

3. The enclosure of claim 1, wherein the membrane includes one of a bellows arrangement, a balloon arrangement, a movable membrane and a deformable or stretchable membrane.

4. The enclosure of claim 1, wherein the first volume compensator comprises a volume compensator housing and the membrane arranged within the volume compensator housing and forms therein the first chamber and the second chamber, the second chamber is part of the compensator volume, the volume compensator housing comprises an aperture to liquidly connect the first chamber with ambient fluid with the first chamber and the second chamber separated by the membrane.

5. The enclosure of claim 1, wherein the first volume compensator comprises a volume compensator housing and a second bellows coupled to the membrane and arranged within the volume compensator housing to form the first chamber and the second chamber, the second chamber being part of the compensator volume, the volume compensator housing including an aperture to liquidly connect the first chamber with ambient fluid, with the first chamber and the second chamber separated by the bellows and membrane.

6. The enclosure of claim 1, wherein the second volume compensator comprises the bellows which surrounds a portion of the housing of the connector assembly to fully enclose the second chamber, the housing of the connector assembly including at least one aperture which liquidly connects the third chamber and the fourth chamber.

7. The enclosure of claim 6, wherein the bellows is secured to an internal surface of the lid, and a passage extends through the lid and liquidly connects the second chamber and the third chamber.

8. The enclosure of claim 1 wherein the lid comprises a first sealing surface and a second sealing surface and the cannister comprises a third sealing surface and a fourth sealing surface, a first seal formed between the first sealing surface and the third sealing surfaces and a second seal formed between the second sealing surfaces and the fourth sealing surface, wherein the first sealing surface is planar and the second sealing surface is cylindrical and normal to the first sealing surface.

9. The enclosure of claim 1 wherein the first volume compensator is mounted to an external surface of the lid or an external surface of the cannister.

10. The enclosure of claim 1 wherein one or more output connectors are connected to the enclosure.

11. The enclosure of claim 1 wherein the one of a control device and a power device includes a transformer located within the enclosure volume.

12. The enclosure of claim 1, wherein the ambient fluid is separated from the first fluid by the membrane, the compensator volume, and the bellows.

13. The enclosure of claim 1, wherein the ambient fluid is seawater at a pressure greater than 300 bars.

14. The enclosure of claim 1, wherein the bellows includes a corrugated portion formed from a metallic material.

15. The enclosure of claim 1, wherein the bellows includes a first corrugated portion having a first maximum diameter and a second corrugated portion having a second maximum diameter smaller than the first maximum diameter, and wherein the first corrugated portion and the second corrugated portion are formed from a metallic material.

16. The enclosure of claim 15, wherein the bellows includes a ring positioned between the first corrugated portion and the second corrugated portion, wherein the first corrugated portion and the second corrugated portion are axially offset from one another along a length of the housing of the connector.

* * * * *